United States Patent [19]

Ban

[11] Patent Number: 5,126,756

[45] Date of Patent: Jun. 30, 1992

[54] IMAGE FORMING DEVICE

[75] Inventor: Yoshiyuki Ban, Chita, Japan

[73] Assignee: Brother Kogyo Kabushiki Kaisha, Nagoya, Japan

[21] Appl. No.: 730,697

[22] Filed: Jul. 16, 1991

[30] Foreign Application Priority Data

Jul. 18, 1990 [JP] Japan .................................. 2-191934

[51] Int. Cl.⁵ .............................................. G01D 15/00
[52] U.S. Cl. .................................. 346/76 L; 346/160; 358/494
[58] Field of Search ................... 346/76 L, 160, 153.1, 346/157; 358/494, 480, 481

[56] References Cited

U.S. PATENT DOCUMENTS

| 4,060,323 | 11/1977 | Hirayama et al. | 346/76 L |
| 4,212,018 | 7/1980 | Ohnishi et al. | 346/76 L |
| 4,399,209 | 11/1983 | Sanders et al. | |
| 4,404,571 | 9/1983 | Kitamura | 346/76 L |
| 4,847,492 | 2/1989 | Houki | |
| 4,864,326 | 9/1989 | Kawamura et al. | 346/76 L |
| 4,940,310 | 7/1990 | Hamada | 358/494 |
| 5,018,805 | 5/1991 | Kessler | 346/160 |

FOREIGN PATENT DOCUMENTS 58-88739 5/1983 Japan .

OTHER PUBLICATIONS

A Continuous-Tone Laser Color Printer, R. R. Firth et al. Journal of Imaging Technology, vol. 14, No. 3, Jun. 1988, pp. 78-89.

Primary Examiner—R. L. Moses
Attorney, Agent, or Firm—Oliff & Berridge

[57] ABSTRACT

In an image forming device using a laser beam having light components of three wavelengths, a separate memory is provided for storing image data for each of the three light components. A reading controller for each of the light components reads the image data for that light component stored in the memory in accordance with a clock circuit. Each clock circuit has a clock frequency that is set variously according to the wavelength of the light component to correct chromatic distortion (chromatism) in the optics. As such, each color frquency is set to be in proportion to an image width resulting from a scan line for each wavelength of light in order to maintain coincidence between colors at the start of the scan line and at the end of the scan line. Therefore, the head position of each color image in the data sending period is matched by an appropriate delay time for the color light from the detection signal of a photosensor and the image width is corrected by the variation in the frequency of the sending clock of each wavelength.

16 Claims, 11 Drawing Sheets

| S1 | FEED A PHOTO SENSITIVE AND PRESSURE SENSITIVE MICROCAPSULE SHEET |
|---|---|
| S2 | EXPOSE PHOTO SENSITIVE AND PRESSURE SENSITIVE MICROCAPSULE SHEET |
| S3 | EXPOSURE OF ONE PAGE OF PICTURE COMPLETED? |
| S4 | FEED PRESSURE SENSITIVE MICROCAPSULE SHEET AND DEVELOPER SHEET |
| S5 | PRESS PHOTO SENSITIVE AND PRESSURE SENSITIVE MICROCAPSULE SHEET |
| S6 | STOP PRESSING |
| S7 | EXECUTE THERMAL FIXING AND DISCHARGEMENT | ered by the data sending device.

IMAGE FORMING DEVICE

BACKGROUND OF THE INVENTION

1. Field of the Invention

The present invention relates to an image forming device for forming an image on a photo sensitive paper by scanning laser beams of three colors, red, green and blue, on the photo sensitive paper by a one dimensional scanning device such as polygon mirror, and by feeding the photo sensitive paper in a direction transverse to a scanning direction, and further by modulating a strength of each color laser beam by synchronizing the beam with the scanning device More particularly, the present invention relates to a mechanism for synchronizing the scanning device and a timing of sending data representative of each color of an image data for an amplitude modulation so as to compensate for chromatic divergence or distortion (chromatism).

2. Description of Related Art

Conventionally, in this kind of image forming device, a laser beam of three colors was scanned by a polygon mirror after these three beams became one beam, as described, for example, in *A Continuous-Tone Laser Color Printer* by Firth et al. (Journal of Imaging Technology, Volume 14, Number 3, Jun. 1988). In this conventional image forming device, a photosensor which reacts to a light having a specific wavelength was set to detect a part of the beam that was separated by a beam splitter from the scanning beam path and thus did not contribute to the image formation on the scanning lines. The sending of the timing of an image data was controlled based on a detection signal from the sensor. Moreover, the distance between the inclination center of the reflecting mirror and the recording medium is enough to make both an image width and the long focus satisfactory so that the inclination scanning angle becomes narrow and distortion of the image is suppressed.

However, in order to suppress the distortion of the formed image, the distance between the inclination center of the reflecting mirror and the recording medium results in the device becoming large. Further, because the inclination scanning angle is narrow, the scanning efficiency is low in the 6 and 8 sided polygon mirrors conventionally used and the image formation speed of the device becomes slow. In the case where the number of sides of the polygon mirror is increased, the manufacturing cost of the mirror increases and the device becomes expensive. Further, the light beam diameter on the inclination scanning center becomes large, and the diameter of the polygon mirror becomes large, so that a large-scale motor is needed to rotate the polygon mirror. Moreover, a strong bearing for supporting the rotation axis is needed and the cost of the device is further increased.

Moreover, even if a fθ lens, in which an image width is in proportion to an angle of incidence, is used in order to avoid the above-mentioned defect, it is difficult to manufacture a scanning lens having enough condensing performance for focusing and keeping the same image width in the scanning direction for the light of the three different wavelengths due to chromatic distortions (chromatism).

SUMMARY OF THE INVENTION

An object of the present invention is to provide a small and relatively cheap image forming device capable of forming a clear image without a misconvergence. The image forming device uses a scanning lens which is satisfied with the linear characteristics of the image width in the scanning direction and focusing characteristics of a light having at least two different wavelengths, but which produces a different image width between each wavelength of light. The device controls the time of sending the appropriate color data to light modulation means based on the detection signal from a photosensor which reacts to light arranged on the scanning lines, and corrects a chromatism of the image width by differing the sending speed of the color data for each wavelength of light.

In order to achieve this object, the image forming device of the present invention comprises a light modulation means for modulating the strength of at least two colors of light having different wavelengths based on the timing data, an optical means for overlapping each modulated light, a light scanning device for scanning the overlapped light in a specific direction, a photosensor set on the scanning lines which reacts to a light, a control means for controlling the time the color data is sent based on the detection timing of each color light by the photosensor; and data sending means whose data sending speed is different respectively.

In the image forming device of the present invention thus structured, each light which passes through the light modulation means is overlapped by the optical means, and is scanned in a specific direction by the light scanning device, is focused by the scanning lens, and then is irradiated on the photosensitive part. The scanning lens can focus the light of each wavelength which is fallen thereon correctly and can keep the linear characteristics of the image width in the scanning direction, even though the absolute value of each image width is different. The light modulation means emits light at the time of the start of the scanning. The group of photosensors detects the arrival of the light of each wavelength and instructs the data sending device to send the color data at the appropriate time to be input to the appropriate light modulation means. The data sending device sends the data to the light modulation means at a speed which is different respectively according to the light color so as to converge over the image width. The light modulation means modulates each light based on the data sent from the data sending device. The photosensitive part is set relatively in a direction transverse (hereinafter referred to as a subscanning direction) to a polygon mirror scanning direction (hereinafter referred to as a main scanning direction), and the image is formed on the photosensitive part as a result.

As mentioned above, according to the present invention, the timing of data sending is controlled according to each color of the laser beam, by differentiating the data sending clock frequencies of each color so that the image position of each color in the scanning direction is converged correctly over the image width. Therefore, a mechanical accuracy which is necessary to coincide the beam of each color laser beam can be reduced, and the clear output image without the misconvergence can be obtained even if the beam position changes as a result of a temperature change. Thus, an image forming device of high accuracy can be provided at a low price.

BRIEF DESCRIPTION OF THE DRAWINGS

A preferred embodiment of the present invention will be described in detail with reference to the following figures, wherein.

DETAILED DESCRIPTION OF THE PREFERRED EMBODIMENT

Hereafter, an embodiment of the present invention is described with reference to the drawings. First, the structure of the image forming device of the present invention is described with reference to FIG. 1 and FIGS. 2A-2C. A photo sensitive and pressure sensitive microcapsule sheet 5 is stored, being wound on a roller 2a, in a cartridge 2 and the used photo sensitive and pressure sensitive microcapsule sheet 5 is wound up on a take-up roller 4. Capsule sheet feeding rollers 3a and 3b, an exposure roller 6, pressure development rollers 8a and 8b and a separation roller 9 are installed in the path between the roller 2a and the take-up roller 4.

As disclosed in Japanese Patent Laid-Open Sho 58-88739 (corresponding to U.S. Pat. No. 4,399,209), the photo sensitive and pressure sensitive microcapsule sheet, as described in this embodiment, is a sheet formed with a base sheet and having microcapsules coated thereon containing a photo hardening resin whose hardness is changed by light, a light polymerization initiator, and a dye precursor.

Figure 1:
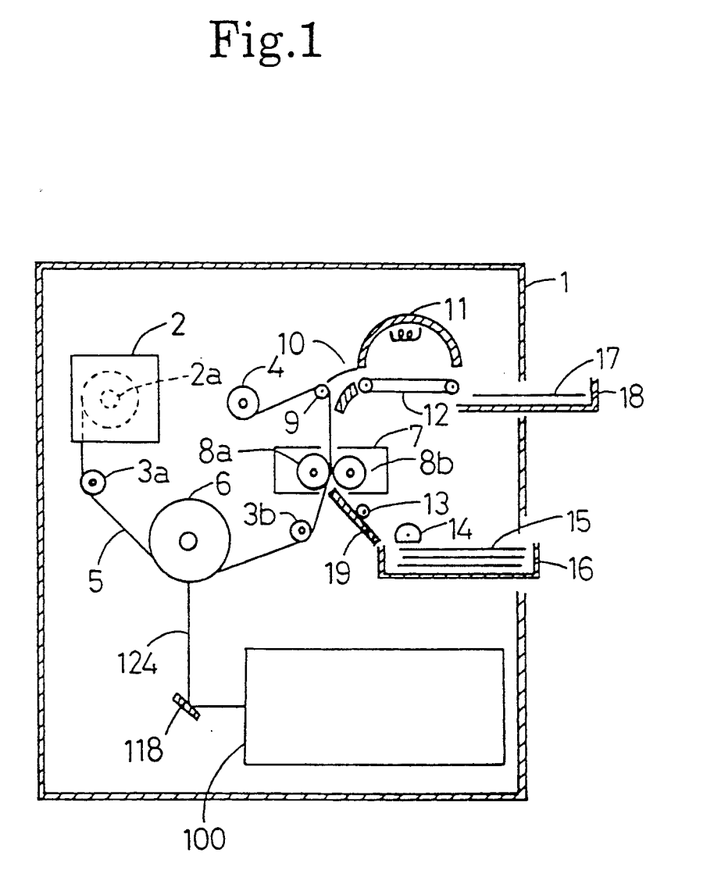
FIG. 1 is a schematic sectional view of the image forming device of the present invention.

A developer sheet 15 is stored in a developer sheet cassette 16 and sheets are fed out, one by one, by a semi-circular roller 14. The developer sheet 15 fed from the developer sheet cassette 16 is sent along a developer sheet guide 19 by a developer sheet feeding roller 13 to be superposed with the photo sensitive and pressure sensitive microcapsule sheet 5 where it is passed between the pressure development rollers 8a and 8b. The microcapsule sheet 5 and developer sheet 15 are then separated by the separation roller 9. A thermal fixing unit 100, which consists of a guide 10 and a thermal fixing feeding belt 12, is arranged in the feeding path of the separated developer sheet 15 and the developer sheet 15 passes through the thermal fixing unit 11 to be discharged to a discharging tray 18 as an output paper 17. The pressure development rollers 8a and 8b are installed in the pressure development unit 7 and both rollers are arranged to be able to come in contact with each other or to separate.

A laser beam, from a laser exposure unit 100, is scanned in the direction of the axis of the exposure roller 6 onto the photo sensitive and pressure sensitive microcapsule sheet 5 as it passes around the exposure roller 6.

Figure 2A:
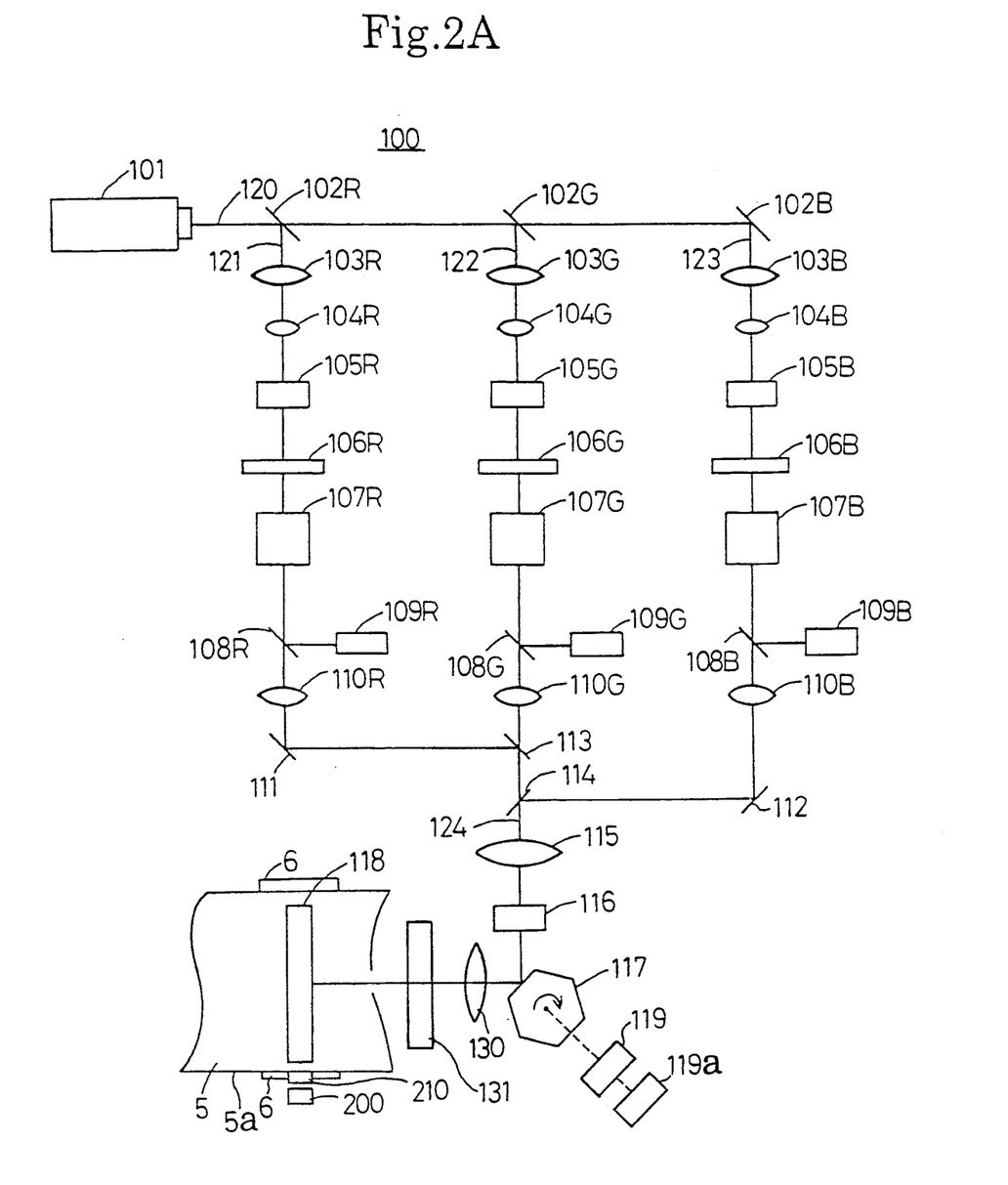
FIG. 2A is a block diagram of an optical structure.
Figure 2B:
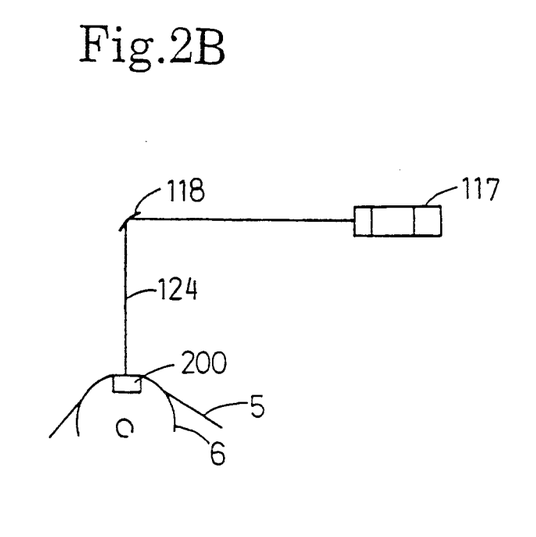
FIG. 2B is a view showing a light path of a laser beam.
Figure 2C:
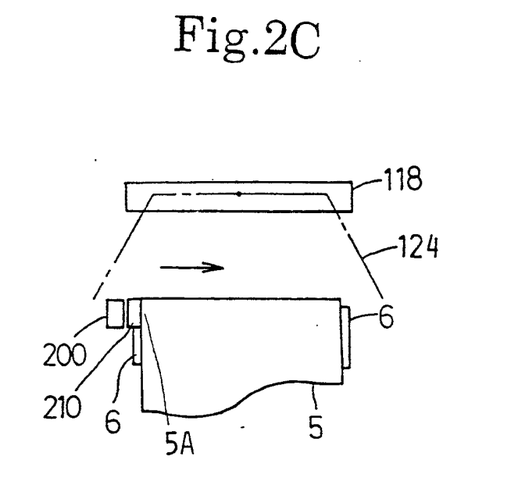
FIG. 2C is an enlarged view showing a light path of a laser beam.

The structure of the laser exposure unit 100 will be described with reference to FIGS. 2A-2C. A laser oscillator 101, for example a hollow cathode He-Cd laser, emits three colored laser beams 120, that is, beams of wave lengths 636 nm (red), 534 nm (green), and 442 nm (blue). A dichroic mirror 102R is arranged for removing only the red element among the laser beams 120 and for directing it as a red laser beam 121 onto a lens 103R. The lens 103R and a lens 104R focus the beam to make its diameter small and project it onto an acoustic optical modulator 105R. The acoustic optical modulator 105R is excited by an acoustic wave of a constant frequency and can modulate the strength of the laser beam to be taken out as a first diffraction light by AM modulation of the acoustic wave according to the image data.

The red laser beam 121, whose strength is modulated by the acoustic optical modulator 105R, is directed onto a half wave retardation plate 106R. The half wave retardation plate 106R is made of, for instance, mica and crystal, and is arranged to be able to make a surface of polarization of the laser beam 121 rotate around the optical axis. A polarization beam splitter 107R, made of a material having a birefringence, such as calcite, is arranged in order to take out only the light component of the laser beam 121 whose surface of polarization is in a specific direction. That is, the polarization beam splitter 107R is structured to be able to control the laser beam intensity by controlling the rotation of the half wave retardation plate 106R around the light axis by means of a CPU 302.

A half mirror 108R is arranged to reflect a part of the laser beam 121 and to direct it onto a light amount sensor 109R, so that an acoustic optical modulator (AOM) driver 340R (FIG. 5) can decide the degree of modulation of the acoustic optical modulator 105R appropriately according to the detected amount of light. On the other hand, that portion of the laser beam which penetrates the half mirror 108R is directed into a laser relay optics 110R and a mirror 111. A beam combiner 113 is arranged on the downstream side of the mirror 111 in the optical path. This beam combiner 113 is constructed with a dichroic mirror. The emitting direction of the red laser beam 121 and that of a green laser beam 122 falling on the beam combiner 113 after following an optical path similar to that of the red laser beam 121 are coincided by the beam combiner 113. A beam combiner 114 follows so that the laser beam coincided by beam combiner 113 is similarly coincided with a blue laser beam 123, which has also followed an optical path similar to that of the red laser beam 121, and becomes a laser beam 124.

A focusing lens 115 is arranged in order so that the above laser beam 124 can form an image on the photo sensitive and pressure sensitive microcapsule sheet 5 backed by the exposure roller 6. Further, the laser beam 124 is focused only in the direction of the rotation axis of a polygon mirror 117 by a cylindrical lens 116. The polygon mirror 117 is rotated at a constant speed by a polygon mirror motor 119. Therefore, the inclination angle of the laser beam 124 is changed by the polygon mirror 117 and it is scanned in the direction of the axis of the exposure roller 6.

A scanning lens 130 is arranged to focus the inclined laser beam in and a cylindrical lens 131 is arranged to focus it in the subscanning direction.

The lenses 130 and 131 cause the chromatic distortion (chromatism) due to the inclined laser beams passing through the lenses. This chromatism is solved by a device to be described later. The inclined laser beam is reflected by a cylindrical mirror 118 and is irradiated to the photo sensitive and pressure sensitive microcapsule sheet 5 backed by the exposure roller 6. The exposure laser beam 124 forms the beam waist at this moment so that the beam diameter should not change greatly on the photo sensitive and pressure sensitive microcapsule sheet 5. The waist size is reduced but not enough to decrease the discrimination ability of the image in the direction of polygon mirror scanning (main scanning direction). The focal length and the position of the laser relay optics 110R, 110G and 110B are adjusted so that the waist size does not differ among the three laser beams. Moreover, the scanning lens 130 is constructed in order to obtain enough focusing characteristics and linear characteristics of the image width in the scanning direction to all colors of light, even if the absolute value of the image width would have been different on the photo sensitive and pressure sensitive microcapsule sheet. On the other hand, in the direction transverse to the main scanning direction, the cylindrical lens 116 and the cylindrical mirror 118 are selected in order not to overlap the beams in the adjacent scanning lines or, conversely, not to separate the adjacent scanning lines on the image. Moreover, the cylindrical lens 116 and the cylindrical mirror 118 also correct the difference in the inclination angle between the adjoining reflection surfaces on the polygon mirror. Further, a photosensor unit 200 is arranged on an extension of the scanning line in the scanning direction and perceives the laser beam 124 falling on the photosensor unit 200 and outputs a detection signal.

Figure 3A:
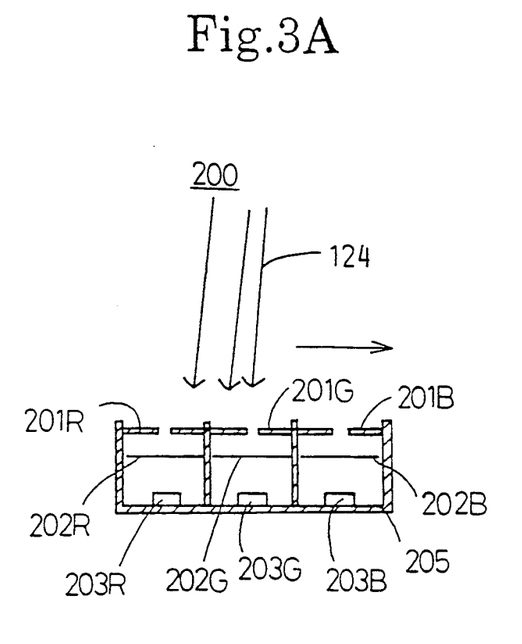
FIG. 3A is a schematic sectional view of a photo sensor unit.
Figure 3B:
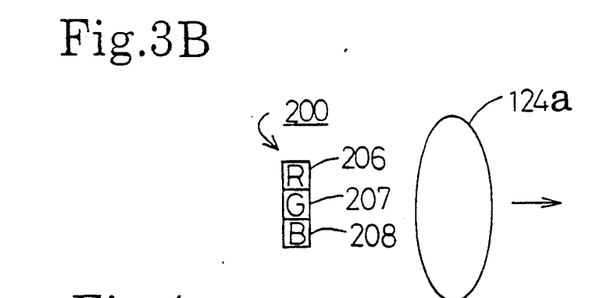
FIG. 3B is a schematic plan view showing the arrangement of phototransistors of the photo sensor unit of FIG. 3A.

The structure of this photosensor unit 200 is described with reference to FIGS. 3A and 3B. In FIG. 3A, the exposure laser beam 124 is projected from an upper side and is scanned from left to right. A case 205 is divided into three parts and phototransistors 203R, 203G and 203B, being photo sensitive to red, green and blue light respectively, are provided therein. The laser beam falling on the case 205, from the upper side, is shaped by a slit 201R, and the red component thereof is passed by a red filter 202R to fall on the phototransistor 203R. Phototransistor 203R outputs a detection signal only when a red component is in the laser beam passing through the aperture of the slit 201R. The other segments of case 205 process the green component and the blue component of laser beam in a similar manner. In the example shown in FIG. 3A, the three phototransistors are arranged along the scanning direction of the laser beam. It is also possible to arrange the three phototransistors 206, 207 and 208, for the three colors, in a space smaller than the beam profile 124a of the laser beam 124 and along a direction transverse to the main scanning direction (FIG. 3B).

Figure 4:
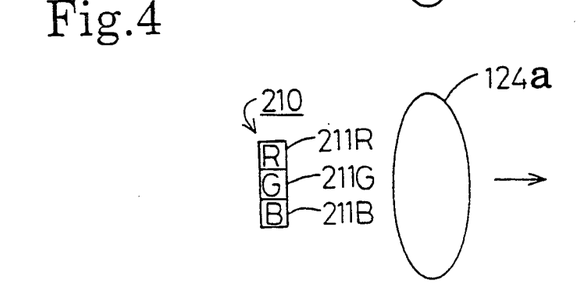
FIG. 4 is a schematic plan view showing the arrangement of phototransistors of a photo sensor unit for delay time control.

Moreover, a photosensor unit 210, for delay time control, is installed on the main scanning line between the photosensor unit 200 and a left side 5A (FIG. 2C) of the photo sensitive and pressure sensitive microcapsule sheet 5. The photosensor unit 210 (FIG. 4), for delay time control, has three phototransistors 211R, 211G and 211B for detecting the color components of the laser beam 124 which correspond respectively to red, green and blue, and its structure is similar to the photosensor unit 200 shown in FIG. 3B. The three phototransistors 211R, 211G and 211B are each connected with a light emitting diode driver 356R, 356G and 356B respectively (hereinafter called "LED driver") and each LED driver 356R, 356G and 356B is connected to an independent light emitting diode 358R, 358G and 358B respectively (hereinafter called "LED").

Figure 5:
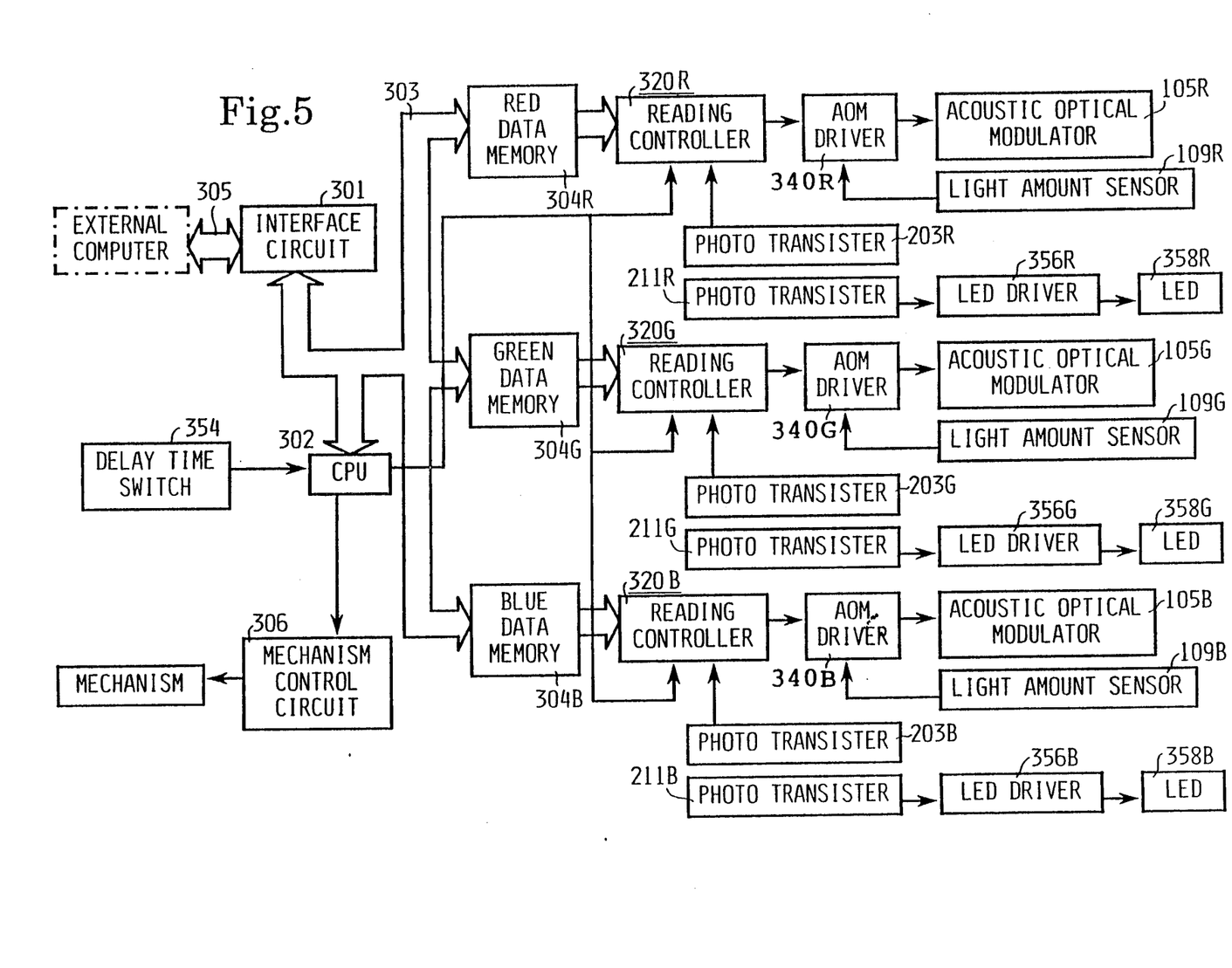
FIG. 5 is a block diagram of a control part.

The structure and operation of the control part of the image forming device in the present invention are described with reference to FIG. 5.

An interface circuit 301 is connected to an external computer by an external interface bus 305. The interface circuit 301 is also connected to a CPU 302, a red data memory 304R, a green data memory 304G, and a blue data memory 304B by an internal bus 303. A reading controller 320R, 320G, 320B is provided for reading the content of each color data memory 304R, 304G, 304B and the appropriate reading controller 320 (320R, 320G, 320B) sends the data to an associated AOM driver 340 (340R, 340G, 340B). A separate reading controller 320 is connected to each of the above data memories 304R, 304G and 304B. The associated AOM driver 340 drives each acoustic optical modulator 105R, 105G and 105B based on the data sent from the associated reading controller 320.

Figure 6:
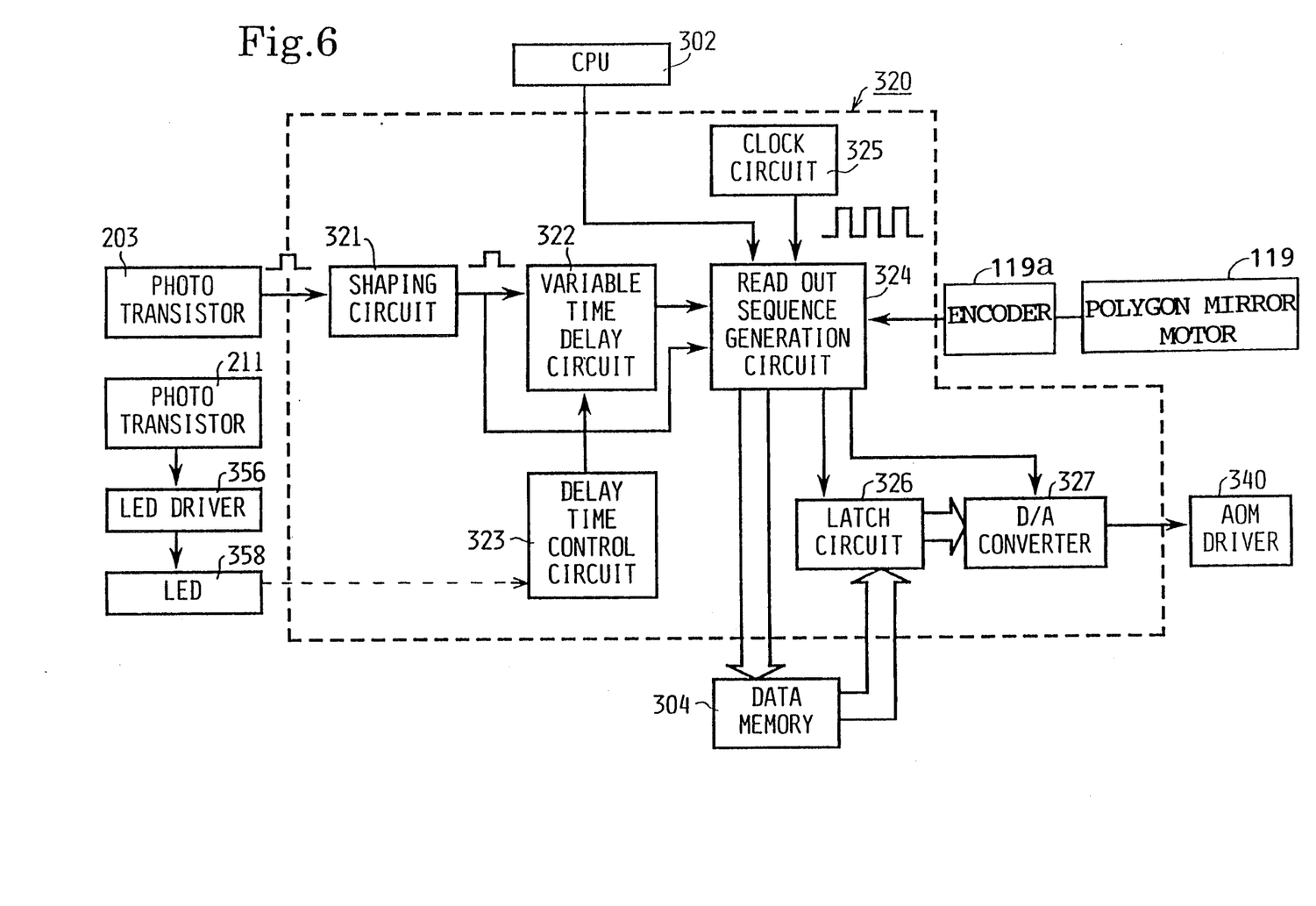
FIG. 6 is a block diagram of a read out controller.
Figures 9A, 9B:
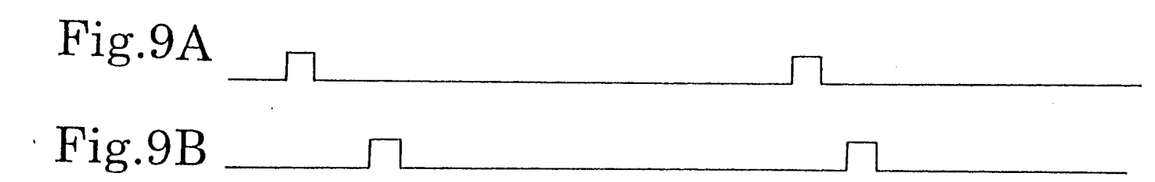
FIGS. 9A-9D are timing charts of the signal of the read out controller.

The operation of each reading controller 320 is explained in detail with reference to FIG. 6 and FIGS. 9A-9D. FIG. 6 shows the structure of the reading controller 320 for a single color, described below using red data. Similar structures exist for green and blue data as well as shown by FIG. 5. An encoder 119A, which has a photo coupler and a shielding disc, is connected to the polygon mirror motor 119. The shielding disk rotates as the polygon mirror motor 119 rotates. When each scanning is started, the encoder 119A outputs a start pulse (FIG. 9A). A read out sequence generation circuit 324R gives an instruction to a D/A converter 327R on receiving a signal of the start pulse which, in turn, provides a maximum value output to the AOM driver 340R and maximizes the laser beam output from the respective associated acoustic optical modulator 105R. The same actions are performed simultaneously in the circuits processing green and blue data to maximize the laser beam outputs from the associated acoustic optical modulators 105G and 105B. The remaining actions described with respect to the red circuit apply to the green and blue circuits as well.

After a certain period of time, the laser beam 124 falls on the phototransistors 203R, of photo sensor unit 200, in accordance with the rotation of the polygon mirror 117 and the phototransistor 203R outputs a detection pulse. Because the start of the scanning line is to the left (FIG. 2C) of photosensor unit 200, by the time laser beam 124 strikes photosensor unit 200 it contains all of the laser beams 121, 122, 123. Thus, each phototransistor 203R, 203G and 203B simultaneously outputs a detection pulse thereby synchronizing the reading controllers 320R, 320G and 320B. Using red as an example, the detection pulse is input to the read out sequence generation circuit 324R after being shaped by a shaping circuit 321R (FIG. 9B). The read out sequence generation circuit 324R gives an instruction to the D/A converter 327R, upon receiving the signal of the detection pulse, which provides a minimum value output to the AOM driver 340R. The AOM drivers 340G, 340B, in their circuits, receive the same instructions at the same time.

Figure 7:
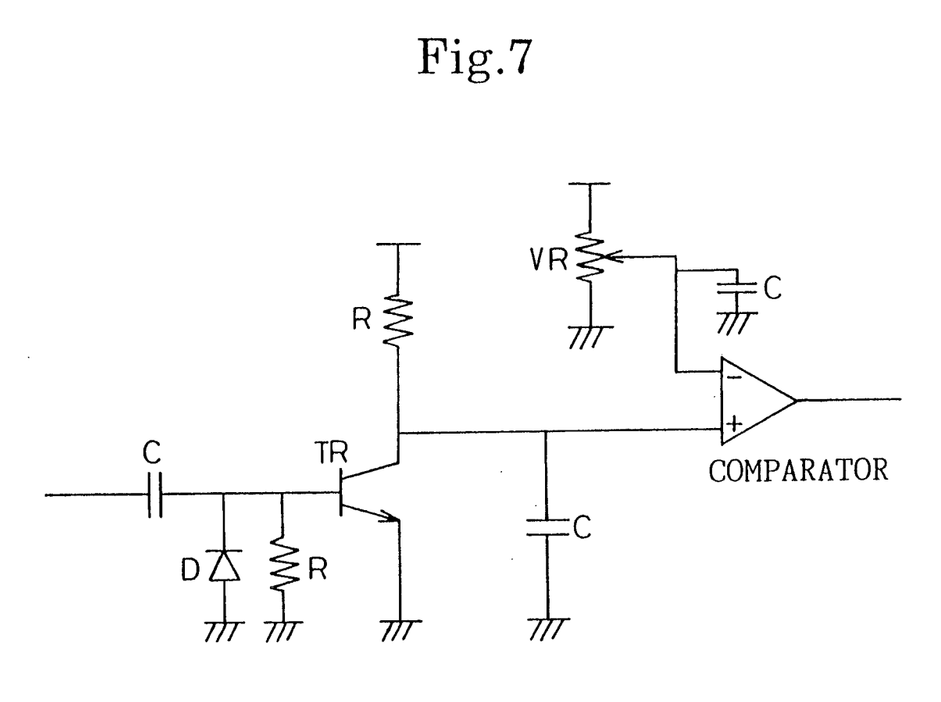
FIG. 7 is a circuit chart showing an example of a variable time delay circuit and a delay time control circuit.
Figure 9C:
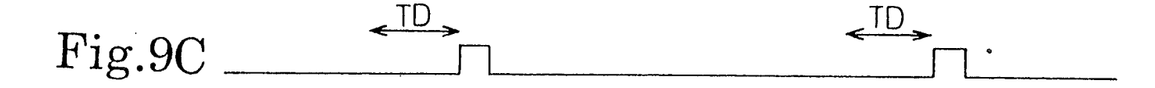
Figure 9D:
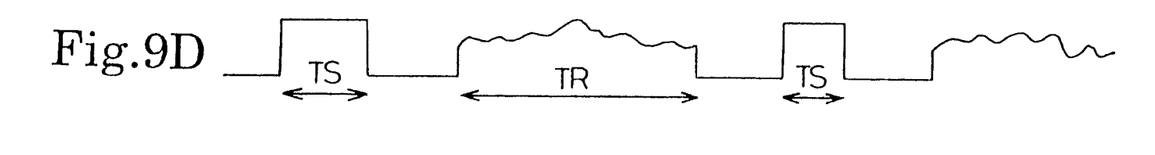
Figure 10:
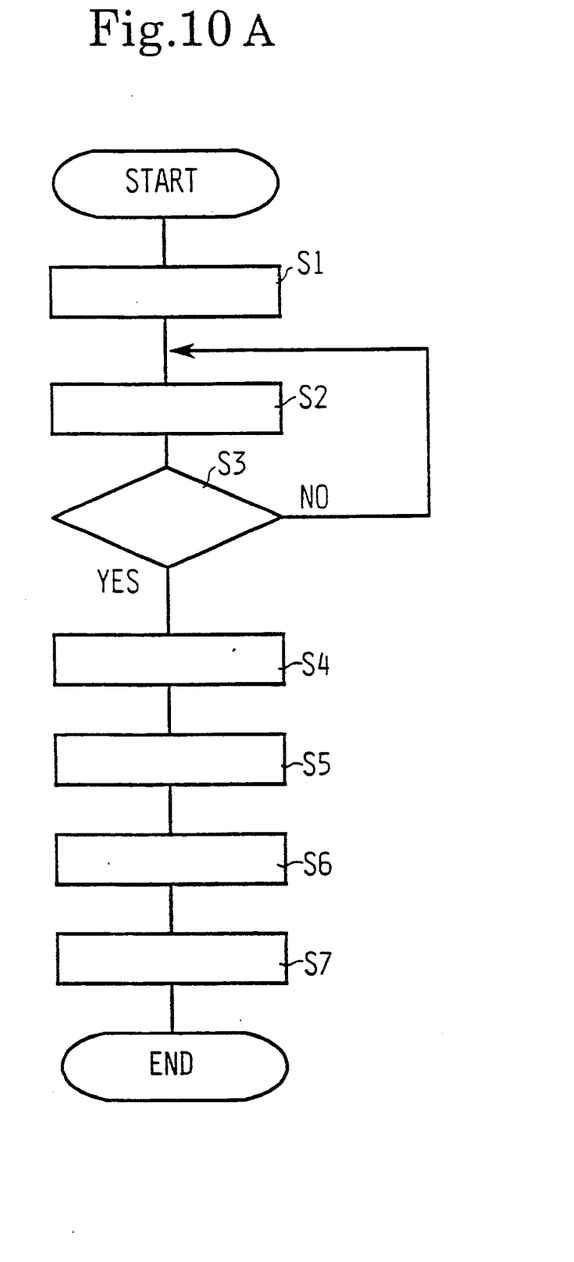
FIG. 10A is a flowchart of the printing operation.
FIG. 10B is a table of labels for the flowchart of FIG. 10A.
Figure 10B:
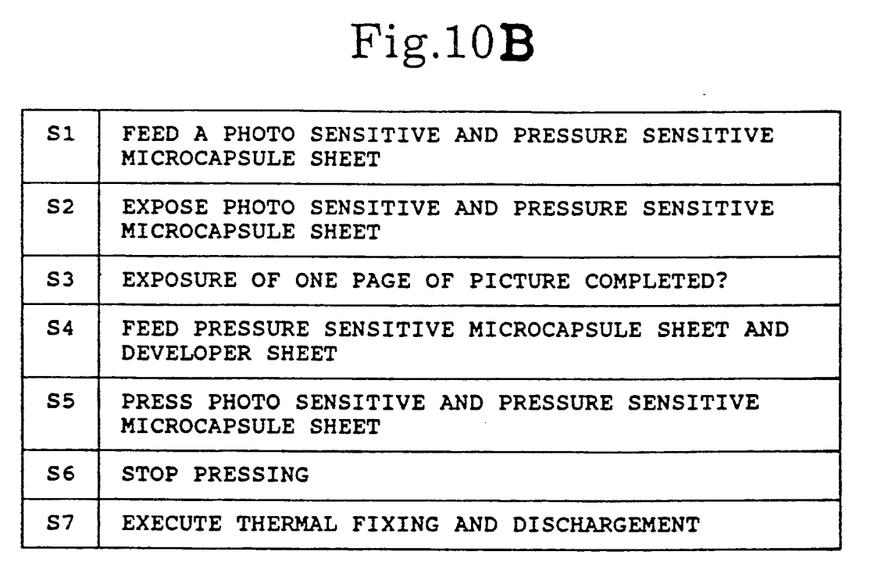

On the other hand, the shaped detection pulse is also input to a variable time delay circuit 322R. The variable time delay circuit 322R delays the pulse by a delay time TD which is decided by the delay time control circuit 323R and outputs it to the read out sequence generation circuit 324R (FIG. 9C). The variable time delay circuit 322R and the delay time control circuit 323R are comprised of a combination of a differentiation circuit and a comparator as shown in FIG. 7. The amount of delay is changed by the adjustment of a volume variable resistor VR. The read out sequence generation circuit 324R reads out the data in the color data memory 304R in accordance with a clock output by a clock circuit 325R on receiving the time delay signal and sends it to a latch circuit 326R. The output from the latch circuit 326R is sent to the D/A converter 327R. If the period for reading the data, outputting it to the D/A converter 327R and outputting of analogue data from the D/A converter 327R to AOM driver 340R is TR, the output from the D/A converter 327R is as shown in FIG. 9D.

The read out sequence generation circuit 324R gives the instruction to the D/A converter 327R when each scanning is started and the encoder 119A outputs a start pulse (FIG. 9A). According to this instruction, the D/A converter 327R provides a maximum value output to the AOM driver 340R during a period TS (FIG. 9D) to determine a standard timing for scanning the laser beam 124 on the exposure roller 6 by detecting the laser beam 124 with the photo sensor unit 200. The output value of the D/A converter 327R decreases to the minimum according to the generation of the detection pulse (FIG. 9C) as mentioned above. Circuits for the blue and green components operate in the same manner.

A clock frequency of the clock circuit 325R is set according to the wavelength of the red laser beam 121 to correct for chromatic distortion (chromatism) in the optics. As such, the clock frequency is set to be in proportion to the image width resulting from a scan line for the red component of the laser beam 124. The clock frequencies of the clock circuits for the green and blue laser beams 122, 123 are set in the same manner in order to maintain coincidence between the colors at the start of the scan line and at the end of the scan line. Therefore, the head position of each color image on the photo sensitive and pressure sensitive microcapsule sheet 5 is matched by an appropriate delay time from the detection signal of the photo sensor unit 200 for each starting time for data sending of each color laser beam 121, 122 and 123 and the image width on the photosensitive and pressure sensitive microcapsule sheet 5 is corrected by the variation in the frequency of the sending clock of the clock circuit for each wavelength.

Figure 8:
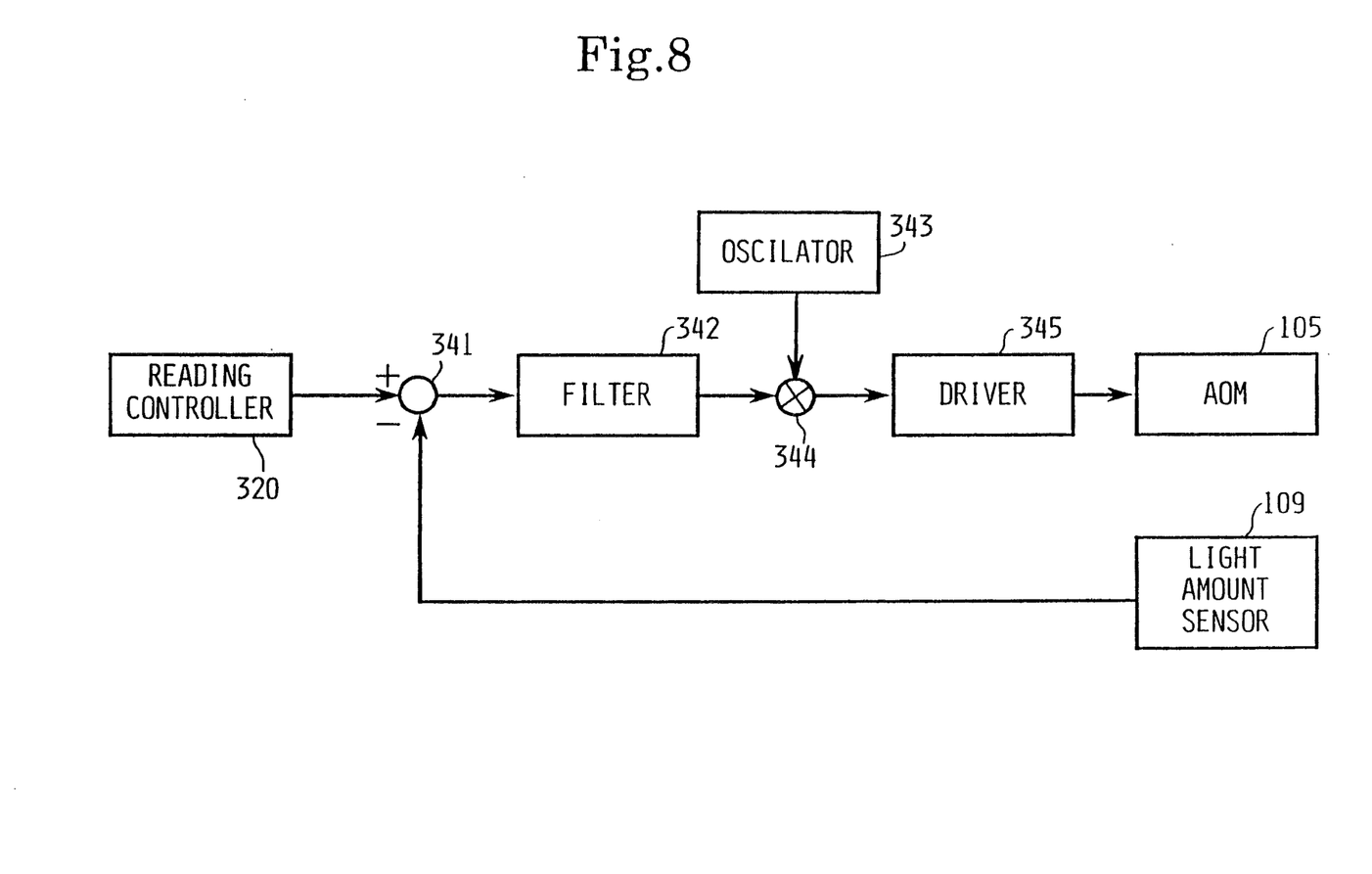
FIG. 8 is a block diagram of an acoustic optical modulator driver.

Next, the operation of each AOM driver 340 is explained with reference to FIG. 8. The explanation is with reference to red elements but an identical structure applies for each color laser beam 121, 122 and 123. The output signal of the reading controller 320R and the output signal of the light amount sensor 109R are input to a differential amplifier 341R. When there is a difference between the two signals, the difference is amplified by the differential amplifier 341R. The amplified signal is filtered by a filter 342R and is input to a multiplier 344R as a modulation signal. At the same time, an oscillator 343R outputs a carrier wave which is also input to the multiplier 344R. Therefore, an AM modulated wave is input to a driver circuit 345R. The driver circuit 345R amplifies the AM modulated wave and drives the piezoelectric device of the acoustic optical modulator 105R. Therefore, the laser beam 121 is diffracted by generating the distribution of the difference of the refractive index based on the signal in the acoustic optical medium, Telluride glass, of the acoustic optical modulator 105R. The first-order diffraction light of the diffracted color laser beam 121 is selected and is sent to the appropriate half mirror 108R, so that the output light intensity is almost in proportion to the filter output.

Moreover, even if there is a noise in the input laser beam 121 (122, 123), the noise does not appear in the exposure laser beam 124 (containing all three color beams 121, 122, 123), because the light amount sensor 109R (109G, 109B) detects a part of the output light, the strength is fed back and compared with the input signal to the driver circuit, and the acoustic optical modulator 105R (105G, 105B) is driven by such a difference.

The adjustment method for the image forming device thus structured is as follows. A setting value of the delay time control circuit 323R for the red color laser beam is set near a center of a range of delay times. The delay time of the variable time delay circuit 322R for the red color laser beam is also set near the center of the range. The delay time control circuits and the variable time delay circuits for the green and blue laser beams are set in the same manner. Next, the three colored laser beams are turned on, then the position of each optical element in the laser exposure unit 100 is adjusted in order that the three colored laser beams are focused at almost the same point on the photo sensitive and pressure sensitive microcapsule sheet 5. In addition, each delay time of the variable time delay circuits is adjusted by the delay time control circuit for adjusting the image data print position along the direction of the polygon mirror scanning based on detection of each color component of the laser beam 124 by each phototransistor 211R, 211G and 211B of the photosensor unit 210.

When the power was first turned on, a delay time switch 354 was activated to cause the CPU 302 to write to the red data memory 304R, the green data memory 304G and the blue data memory 304B the data for outputting the color laser beams 121, 122 and 123 which corresponds to the position where each color component of the laser beam 124 strikes the photosensor unit 210 to establish the delay time control. The color laser beams 121, 122 and 123, which correspond to the above data, are controlled, respectively, and are output toward the photosensor unit 210 to establish the delay time control. The delay time is initiated from the detection of the laser beam 124 by the photosensor unit 200 as described previously.

In this case, the photosensor unit 210 for delay time control outputs the detection signal for the laser beam only when the output timing of the laser beam is accurately matched to the position of the photosensor unit 210 for delay time control. The photosensor unit 210 for delay time control outputs an independent detection signal for each color of the received component of the laser beam 124. A detection signal is input only to the LED driver that corresponds to the color detected, and the LED driver receiving the detection signal activates the corresponding LED. Therefore, the operator has only to adjust the volume of the variable resistor VR of the delay time control circuit which corresponds to the respective LED, so that all three of the LEDS 358R, 358G and 358B emit light. From the above, the delay time of the variable time delay circuits 322R, 322G and 322B of each color is set so that all three color components of the laser beam 124 expose the same position at the same time on the photosensitive and pressure sensitive microcapsule sheet 5 as it is backed by exposure roller 6.

Next, the operation of the image forming device of the above-mentioned embodiment, following the calibration or adjustment of the laser beam coincidence, is explained with reference to FIGS. 1-10. The CPU 302 inputs an image data to the red data memory 304R, the green data memory 304G, and the blue data memory 304B corresponding to each color according to instructions from the external computer. In addition, according to the instructions for output from an external computer, the CPU 302 gives instructions to all elements of the image forming device and the following operations are executed.

First, CPU 302 directs the mechanism control circuit 306 to feed a photo sensitive and pressure sensitive microcapsule sheet 5 at a constant speed (S1).

Next, the CPU 302 instructs the reading controllers 320R, 320G, 320B to read the data in the data memories 304R, 304G, 304B, respectively. The photo sensitive and pressure sensitive microcapsule sheet 5 backed by the exposure roller 6 is then exposed for one line (S2). At this time, even if there is a scanning position disagreement of each color component of the laser beam 124 reflected at one time on the polygon mirror 117 in the scanning direction, the misconvergence of the exposed image is prevented because the timing of the data sent from the D/A convertor 327 to the associated AOM driver 340 is arranged by every color. Moreover if there is a scanning position disagreement of each color component of the laser beam 124 reflected at one time on the polygon mirror 119 in the subscanning direction, misconvergence in the subscanning direction is prevented by appropriately arranging the cylindrical mirror 118. In addition, the misconvergence in the main scanning direction owing to the chromatism is prevented, because each data stored in the data memory 304R, 304G and 304B of each color is read in synchronization with the clock pulse generated at the appropriate clock circuit of which the frequency is in proportion to the absolute value of each color image width.

Next, the CPU 302 proceeds to expose the photo sensitive and pressure sensitive microcapsule sheet 5 line by line to complete the exposure of one page. During this time, the feeding speed of the photo sensitive and pressure sensitive microcapsule sheet 5 is automatically adjusted so that the length and breadth ratio of the image is correct.

Then, the microcapsules, which are in the part of the photo sensitive and pressure sensitive microcapsule sheet 5 where the light is irradiated by the exposure, stiffen and the microcapsules in the part where the light is not irradiated are left soft. Therefore, a latent image of the color image is formed on the surface of the photo sensitive and pressure sensitive microcapsule sheet 5 by the exposure.

The CPU 302 continues to drive the capsule sheet feeding rollers 3a and 3b and the take-up roller 4. When a start position of the latent image formed on the photo sensitive and pressure sensitive microcapsule sheet 5 reaches a predetermined position before reaching the pressure development rollers 8a and 8b, the CPU 302 drives the semi-circular roller 14. Then, a developer sheet 15 is fed towards the developer sheet guide 19, and then sent to the predetermined position before the pressure development rollers 8a and 8b by the developer sheet feeding roller 13 (S4). The CPU 302 controls the pressure development rollers 8a and 8b to rotate and apply pressure to the microcapsule sheet 5 and the developer sheet 15 as they are pressed together in a face to face relationship (S5).

At this time, the exposure side of the photo sensitive and pressure sensitive microcapsule sheet 5 and the developer coating side of the developer sheet 15 confront and pass between the pressure development rollers 8a and 8b. The stiffened microcapsules do not rupture and the soft microcapsules are ruptured so that their contents react with the developer and the color image is formed on developer sheet 15.

Next, the CPU 302, stops the rotation of the capsule sheet feeding rollers 3a and 3b and the take-up roller 4 and expands the space between the pressure development rollers 8a and 8b (S6) at the end of the developer sheet 15.

The CPU 302 then controls the feed of the developer sheet 15 to the thermal fixing unit 11 by way of the guide 10 and the thermal fixing feeding belt 12 and discharges the developer sheet 15 to the discharging tray 18 as an output paper 17 after the thermal fixing is completed (S7).

Thus, a process for outputting a color image using a photo sensitive and pressure sensitive microcapsule sheet 5 ends.

In this embodiment, the delay time of each variable time delay circuit 322 is adjusted in order to accurately match the position of the images of three colors to be exposed, so that the adjustment of the position of the images is very easy. Moreover, since the object of the present invention is to coincide the three color laser beams at one position, the delay time for one color laser beam can be fixed and does not need to be changeable; the other two being changeable.

It is to be understood that the present invention is not restricted to the particular forms shown in the foregoing embodiment, and various modifications and alterations can be made thereto without departing from the scope of the invention encompassed by the appended claims. For example, the scanned laser beam 124 can be led into the phototransistor by using an optical fiber for the photo sensor part and silver salt film can be used instead of the photo sensitive and pressure sensitive microcapsule sheet 5. Moreover, it is possible to finely adjust the device to temperature changes by being constructed so that a frequency of each of the clock circuits 325 may be changeable.

What is claimed is:

1. An image forming device forming an image on a photosensitive member according to image data comprising:

light modulation means for modulating each strength of at least two colors of light having different wavelengths based on an image data by optical means for overlapping each modulated light;

a light scanning device for scanning the overlapped light on the photosensitive member; and correspondence control means for controlling a correspondence between scanning position scanned by the light scanning device and the image data to be output to the scanning position, wherein the image data are separately constructed for each color of light and the correspondence control means has means for sending the each image data to the light modulation means at a speed that varies corresponding to the wavelength of the light.

2. An image forming device as claimed in claim 1, further comprising a clock circuit for each of said at least two colors of light, each said clock circuit operating at a different frequency that controls the speed each image data is sent to the light modulator means.

3. The image forming device according to claim 2, further comprises,
a photosensor disposed on a scanning line made by the light scanning device for detecting a time point when a scanning made by the light scanning device reaches a basic position for sending the image data, and
timing control means for controlling the image data sending timing based on the time point detected by the photo sensor.

4. An image forming device, comprising:
a laser for emitting laser beams of at least two different wavelengths of light;
a light modulation means for modulating the strength of each of said at least two wavelengths of light;
an optical means for overlapping said laser beams after being modulated to form an exposure laser beam;
a light scanning device for scanning the laser beam along its scanning line;
a memory means for each wavelength of light for storing color point data;
a clock circuit for each of said at least two different wavelengths of light;
a reading controller for each of said at least two different wavelengths of light for reading color print data from said memory means at a speed synchronized with a clock pulse as generated by said clock circuit; and
a control means for electronically integrating and controlling the elements of the image forming device.

5. An image forming device as claimed in claim 4, further comprising a photosensor unit positioned adjacent to but after the starting end of a scanning line, said photosensor unit being sensitive to at least one wavelength of light and outputting a detection pulse when struck by the wavelength of light.

6. An image forming device as claimed in claim 5, wherein said photosensor unit is positioned away from the start end of the scanning line so that the exposure laser beam contains all wavelengths of light when striking said photosensor unit, said detection pulse being simultaneously output to each said reading controller and said reading controller initiating a time delay for reading corresponding color point data from a corresponding said memory means.

7. An image forming device as claimed in claim 6, wherein said photosensor unit comprises a plurality of photosensors, wherein one photosensor of said plurality of photosensors is sensitive to one of said at least two colors of light in a paired relationship.

8. An image forming device as claimed in claim 7, further comprising a second photosensor unit, said second photosensor unit having a separate phototransistor for each of said at least two different wavelengths of light.

9. An image forming device as claimed in claim 8, wherein each said reading controller further comprises a delay time control circuit and a variable time delay circuit, said phototransistor of said second photosensor unit sensitive to one of said at least two different wavelengths of light being connected to the delay time control circuit of the reading controller associated with a same wavelength of light.

10. An image forming device as claimed in claim 9, wherein each said phototransistor of said second photosensor unit lights an associated LED upon being exposed to the wavelength of light to which it is sensitive.

11. An image forming device as claimed in claim 10, further comprising a manual adjustment means whereby an operator can adjust a time delay for at least one of said at least two different wavelengths of light by means of said variable time delay circuit based upon observing said associated LED.

12. An image forming device as claimed in claim 6, wherein each said clock circuit has a clock frequency set to be in proportion to an image width resulting from a scan line of the wavelength of light so as to maintain coincidence between colors at the start of the scan line and at the end of the scan line by controlling the reading speed for the color point data.

13. A method of coinciding the scanning line width of an image forming device using an exposure laser beam composed of at least two overlapped color laser beams so that upon initiation of printing the resultant image is clear, the method comprising the steps of:
turning on the device;
initiating a simultaneous pulse for generating each color laser beam;
scanning an overlapped exposure laser beam across a photosensor;
initiating a simultaneous detection for each color laser beam;
initiating a time delay appropriate for each color laser beam;
reading color data from a color memory for each color laser beam at a speed proportional to an image width resulting from a scan line for each wavelength;
emitting an image data stream of each color laser beam; and
scanning a scanning line with the exposure laser beam containing the at least two overlapped color laser beams.

14. A method of coinciding the scanning line width as claimed in claim 13, wherein the step of reading color data is controlled by a clock frequency used by a clock circuit for each color laser beam, said clock frequency establishing the speed for reading color data.

15. An image forming device for coinciding the scanning line width of an exposure laser beam composed of at least two overlapped color laser beams so that upon initiation of printing the resultant image is clear, comprising:
means for turning on the device;
means for initiating a simultaneous pulse for generating each color laser beam;
means for scanning an overlapped exposure laser beam across a photosensor;
means for initiating a simultaneous detection for each color laser beam;
means for initiating a time delay appropriate for each color laser beam;
means for reading color data from a color memory for each color laser beam at a speed proportional to an image width resulting from a scan line for each wavelength;

means for emitting an image data stream of each color laser beam; and means for scanning a scanning line with the exposure laser beam containing the at least two overlapped color laser beams.

16. An image forming device as claimed in claim 15, wherein said means for reading color data for each color laser beam comprises:
 a reading controller; and
 a clock circuit operating at a frequency that determines the speed at which the reading controller reads the color data.

* * * * *